(12) United States Patent
Shi et al.

(10) Patent No.: US 7,500,612 B2
(45) Date of Patent: Mar. 10, 2009

(54) COMPACT IMAGING LENS ASSEMBLY IN IMAGING READER

(75) Inventors: David Tsi Shi, Stony Brook, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 191 days.

(21) Appl. No.: 11/496,286

(22) Filed: Jul. 31, 2006

(65) Prior Publication Data

US 2008/0023554 A1    Jan. 31, 2008

(51) Int. Cl.
*G06K 7/10* (2006.01)

(52) U.S. Cl. ............... 235/454; 235/462.14; 235/472.01

(58) Field of Classification Search ................. 235/454, 235/462.14, 472.01; 902/22
See application file for complete search history.

(56) References Cited

U.S. PATENT DOCUMENTS

| | | | | |
|---|---|---|---|---|
| 5,406,063 A | * | 4/1995 | Jelen | 235/462.46 |
| 6,431,452 B2 | * | 8/2002 | Feng | 235/472.01 |

* cited by examiner

*Primary Examiner*—Seung H Lee
(74) *Attorney, Agent, or Firm*—Kirschstein, et al.

(57) ABSTRACT

A compact imaging lens assembly focuses light from indicia along an optical path onto a solid-state imager of an imaging reader. The lens assembly includes a pair of end focusing lenses of substantially a same size and spaced apart along the optical path, an intermediate lens between the end lenses, and an aperture stop between the end lenses.

18 Claims, 3 Drawing Sheets

COMPACT IMAGING LENS ASSEMBLY IN IMAGING READER

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, horizontal window is set flush with, and built into, a horizontal countertop of the workstation. Products to be purchased bear an identifying symbol and are typically slid or swiped across the horizontal window through which a multitude of scan lines in a scan pattern is projected in a generally upward direction. Each scan line is generated by sweeping a laser beam from a laser. When at least one of the scan lines sweeps over a symbol associated with a product, the symbol is processed and read.

Instead of, or in addition to, a horizontal slot scanner, it is known to provide a vertical slot scanner, which is typically a portable reader placed on the countertop such that its window is generally vertical and faces an operator at the workstation. The generally vertical window is oriented perpendicularly to the horizontal window, or is slightly rearwardly inclined. A scan pattern generator within the vertical slot scanner also sweeps a laser beam and projects a multitude of scan lines in a scan pattern in a generally outward direction through the vertical window toward the operator. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and for processing two-dimensional symbols, such as Code 39, as well. Code 39 introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers, instead of moving a laser beam across the symbols in a scan pattern. For example, an image sensor device may be employed which has a one- or two-dimensional array of cells or photosensors, which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information over a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to focus light from the symbol onto the photosensors by an imaging lens assembly in front of the image sensor device. The lens assembly typically comprises a plurality of lenses of different sizes and powers. Although generally satisfactory for its intended purpose, the overall size of the known imaging lens assembly is relatively large, thereby limiting the usefulness of the known imaging lens assembly in portable and mobile applications where size and weight are at a premium.

SUMMARY OF THE INVENTION

One feature of the present invention resides, briefly stated, in a reader for, and a method of, electro-optically reading indicia, especially one- or two-dimensional symbols. The reader could be embodied as a stationary or portable point-of-transaction workstation having a window, or as a handheld reader having a window. In some applications, the window can be omitted, in which event, the reader has a windowless opening at which the indicia are located for reading. As used herein, the term "presentation area" is intended to cover both a window and a windowless opening. In the case of the workstation, the symbol is swiped past, or presented to, the presentation area and, in the case of the handheld reader, the reader itself is moved and the presentation area is aimed at the symbol. In the preferred embodiment, the workstation is installed in a retail establishment, such as a supermarket.

A one- or two-dimensional, solid-state imager is mounted in the reader, and includes an array of image sensors operative for capturing light from a one- or two-dimensional symbol or target through the presentation area over a field of view during the reading. Preferably, the array is a CCD or a CMOS array.

When the reader is operated in low light or dark environments, an illuminator is also mounted in the reader and illuminates the symbol during the reading with illumination light directed from an illumination light source through the presentation area. The illumination light source is preferably at least one light emitting diode (LED), and preferably a plurality of LEDs.

In accordance with this invention, an imaging lens assembly is provided in the housing for focusing the illumination light from the indicia along an optical path onto the sensors. The lens assembly includes a pair of end focusing lenses of substantially a same size and spaced apart along the optical path, an intermediate lens between the end lenses, and an aperture stop between the end lenses. In the preferred embodiment, the end lenses have optical powers of the same sign and of approximately the same magnitude. The intermediate lens is positioned within an aperture of the aperture stop and has an optical power of an opposite sign to that of the end lenses and approximately compensating for the total optical powers of the end lenses. The intermediate lens is positioned midway between the end lenses. The resulting assembly is more compact than heretofore, and is usefully employed in portable and mobile applications where size and weight are at a premium.

The novel features which are considered as characteristic of the invention are set forth in particular in the appended claims. The invention itself, however, both as to its construction and its method of operation, together with additional objects and advantages thereof, will be best understood from

DETAILED DESCRIPTION OF THE PREFERRED EMBODIMENTS

Figure 1:
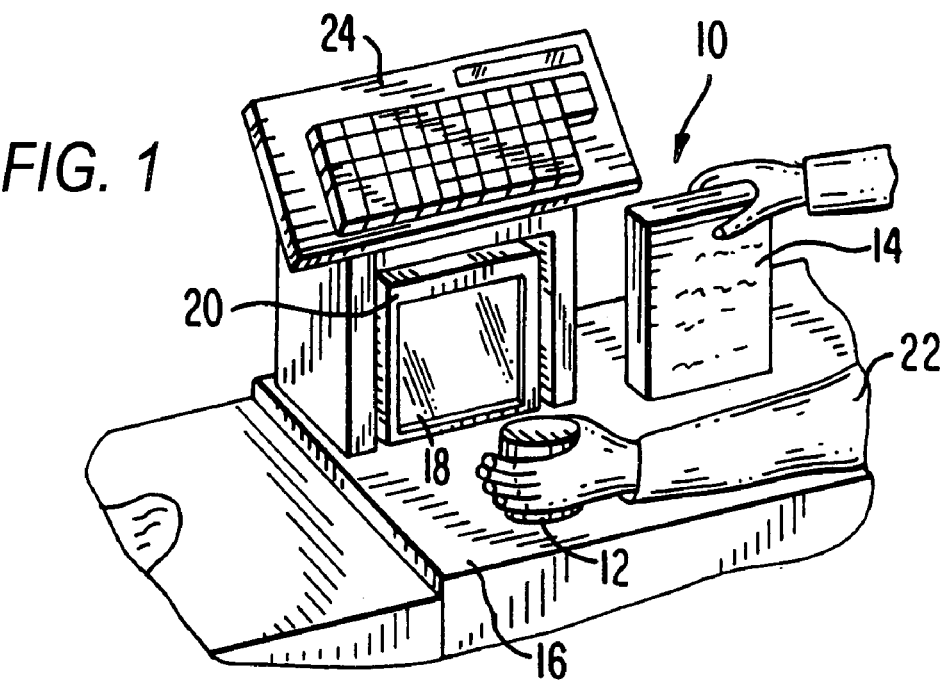
FIG. 1 is a perspective view of a point-of-transaction workstation operative for capturing light from symbol-bearing targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a vertical window (i.e., presentation area) 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
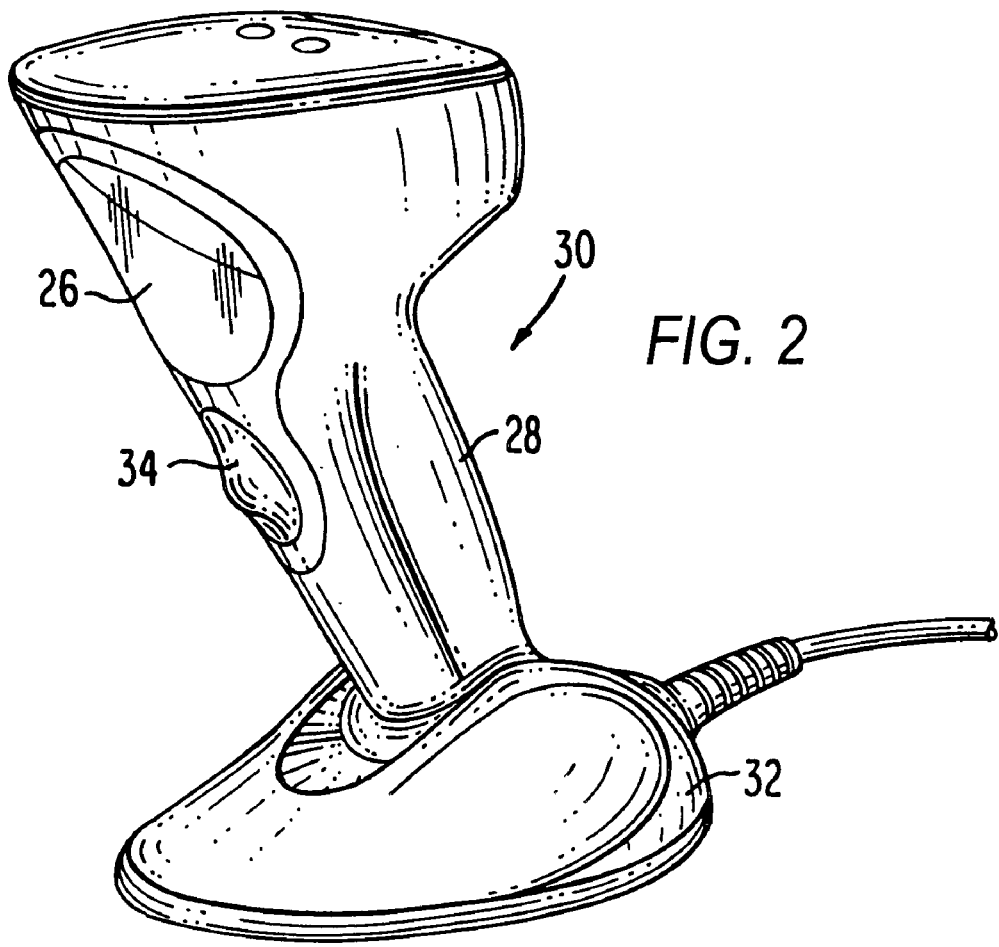
FIG. 2 is a perspective view of an electro-optical reader operative in either a hand-held mode, or a workstation mode, for capturing light from symbol-bearing targets in accordance with this invention.

Reference numeral 30 in FIG. 2 generally identifies another reader having a different configuration from that of reader 20. Reader 30 also has a generally vertical window (i.e., presentation area) 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

Figure 3:
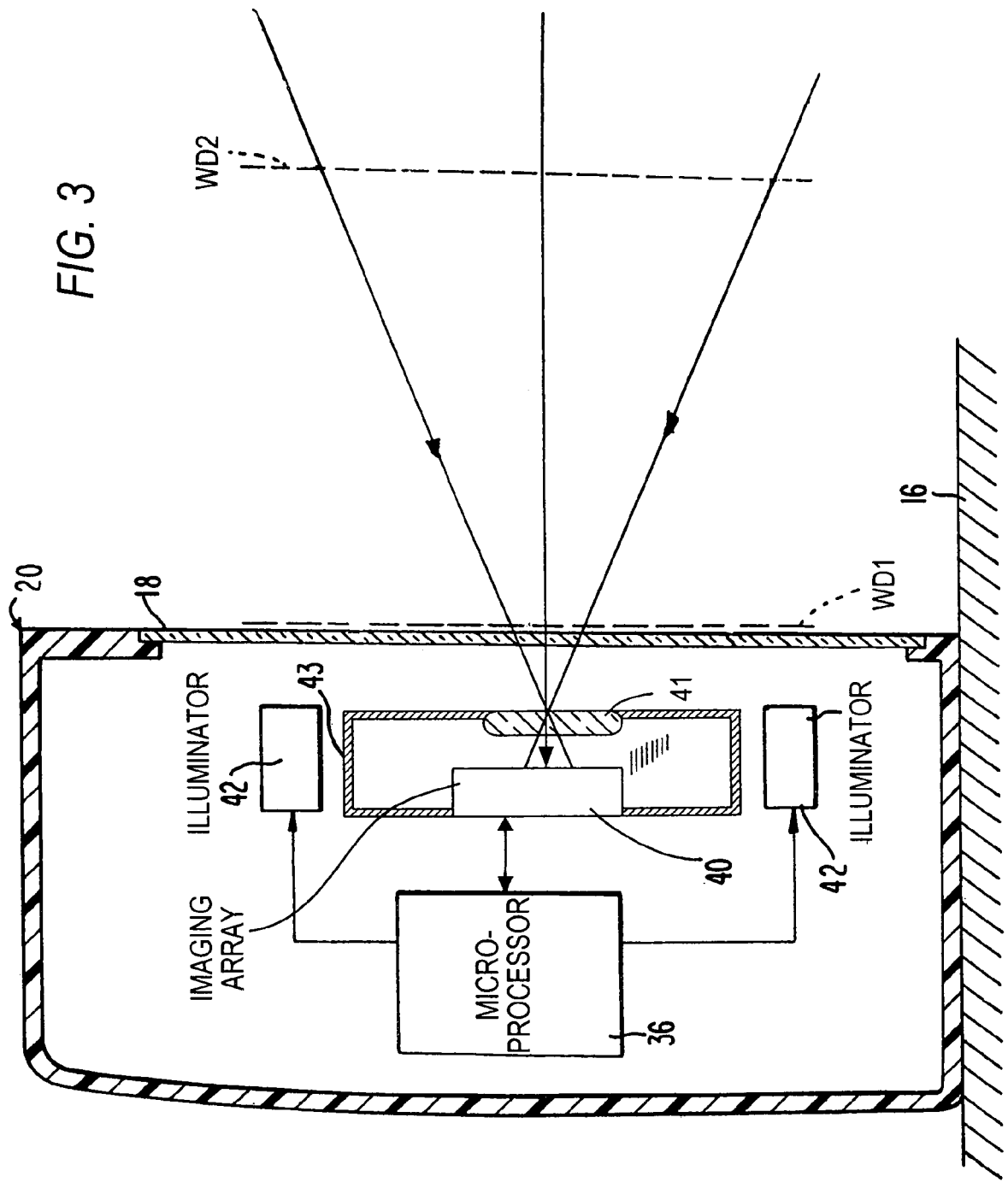
FIG. 3 is a block diagram of various components of the workstation of FIG. 1.

As described so far, the readers 20, 30 are conventional. As schematically shown in FIG. 3, an imager 40 and an imaging lens assembly 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator is also mounted in the reader and preferably includes a plurality of light sources, e.g., light emitting diodes (LEDs) 42, arranged at opposite sides of the imager 40 to uniformly illuminate the target.

As shown in FIG. 3, the imager 40 and the illuminator LEDs 42 are operatively connected to a controller or microprocessor 36 operative for controlling the operation of these components. Preferably, the microprocessor is the same as the one used for decoding light scattered from the indicia and for processing the captured target images.

In operation, the microprocessor 36 sends a command signal to pulse the illuminator LEDs 42 for a short time period, say 500 microseconds or less, and energizes the imager 40 to collect light from a target symbol only during said time period. A typical array needs about 33 milliseconds to read the entire target image and operates at a frame rate of about 30 frames per second. The array may have on the order of one million addressable image sensors.

Although the aforementioned imaging lens assembly 41 is depicted as a single lens, this was done to simplify the drawing. In practice, the lens assembly 41 includes a plurality of optical lenses arranged along the optical path to focus the illumination light from the indicia onto the imager. In the prior art, these lenses are configured with different sizes and different optical powers, thereby increasing the overall size of the assembly.

Figure 4:
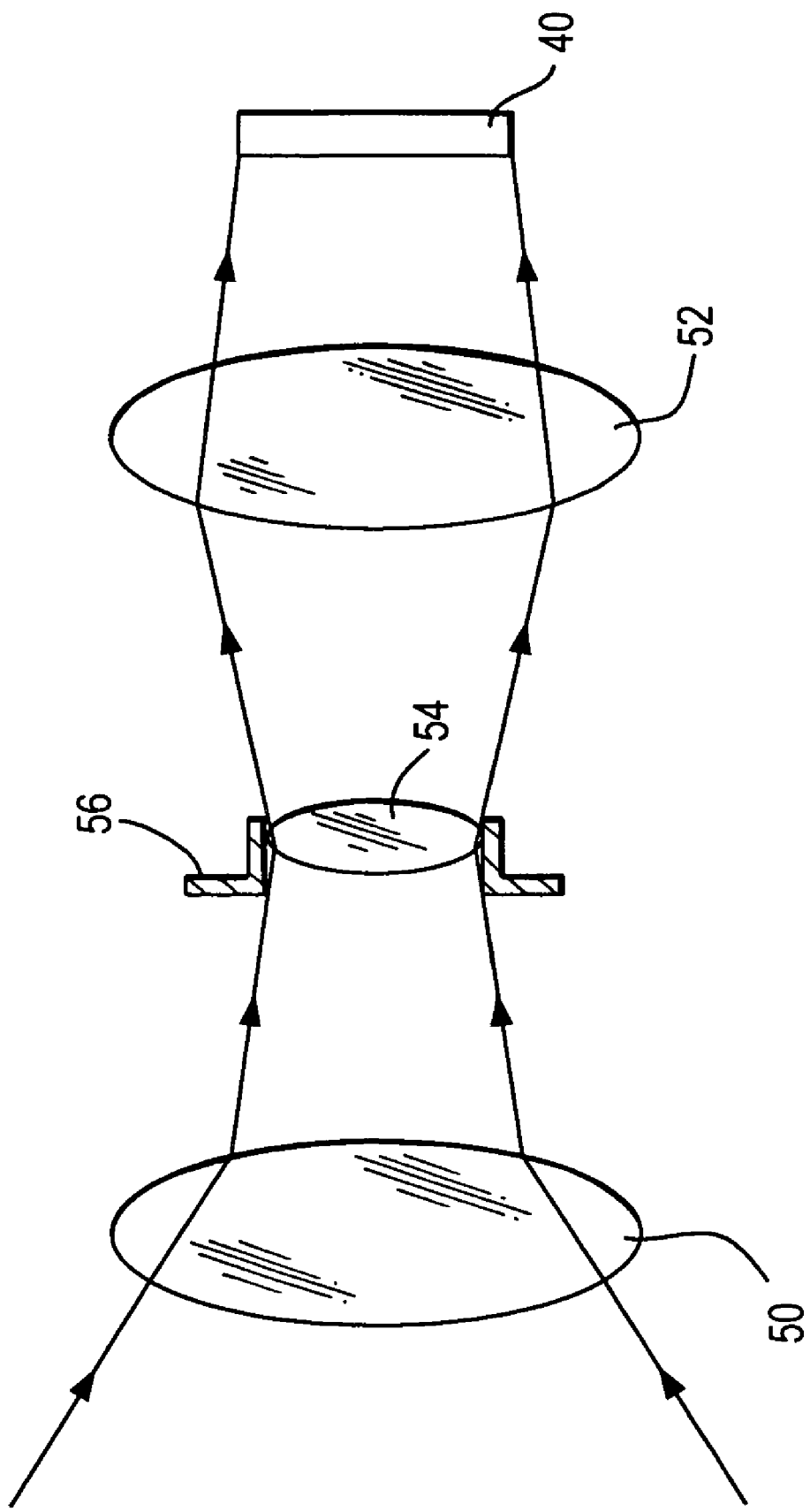
FIG. 4 is a schematic view of a compact imaging lens assembly for focusing light onto an imager in accordance with this invention.

In accordance with the invention, as depicted in FIG. 4, the lens assembly includes a pair of end focusing lenses 50, 52 of substantially a same size and spaced apart along the optical path, an intermediate lens 54 between the end lenses 50, 52, and an aperture stop 56 between the end lenses 50, 52. In the preferred embodiment, the end lenses 50, 52 have optical powers of the same sign and of approximately the same magnitude. In one exemplary embodiment, the ratio of the optical powers of the end lenses is about 1.5. The intermediate lens 54 is positioned within an aperture of the aperture stop 56 and has an optical power of opposite sign to that of the end lenses. The intermediate lens 54 is positioned midway between the end lenses 50, 52. The optical power of the intermediate lens approximately compensates for the total optical power of the end lenses. Thus, in the exemplary embodiment, if end lens 50 has an optical power of +1.5, and if end lens 52 has an optical power of +1.0, then if the overall desired optical power of the assembly is to be +0.5, then the optical power of the intermediate lens 54 is −2.0. The resulting assembly is optically balanced and more compact than heretofore, and is usefully employed in portable and mobile applications where size and weight are at a premium.

It will be understood that each of the elements described above, or two or more together, also may find a useful application in other types of constructions differing from the types described above. Thus, readers having different configurations can be used.

While the invention has been illustrated and described as a compact imaging lens assembly for focusing light onto an imager in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
    a housing having a presentation area;
    a solid-state imager in the housing and including an array of image sensors for capturing light through the presentation area from the indicia over a field of view during reading; and a compact imaging lens assembly for focusing the light from the indicia along an optical path onto the sensors, including a pair of end focusing lenses of substantially a same size and spaced apart along the optical path, an intermediate lens between the end lenses, and an aperture stop between the end lenses, the end lenses having optical powers of a same sign and of about a same magnitude.

2. The reader of claim 1, wherein the intermediate lens is positioned within an aperture of the aperture stop and has an optical power of opposite sign to that of the end lenses.

3. The reader of claim 1, wherein the intermediate lens is positioned midway between the end lenses.

4. The reader of claim 1, wherein the intermediate lens has an optical power having a magnitude that compensates for the magnitudes of the end lenses.

5. The reader of claim 1, and an illuminator in the housing for illuminating the indicia during reading with illumination light directed from an illuminating light source through the presentation area, and wherein the imaging lens assembly is operative for focusing the illumination light captured from the indicia onto the sensors.

6. The reader of claim 5, wherein the illuminating light source includes a plurality of light emitting diodes (LEDs).

7. The reader of claim 1, wherein the housing has a handle for handheld operation.

8. The reader of claim 1, wherein the housing has a base for supporting the housing on a support surface for workstation operation.

9. A reader for electro-optically reading indicia, comprising:
  housing means having a presentation area;
  imaging means in the housing means including a solid-state imager having an array of image sensors for capturing light through the presentation area from the indicia over a field of view during reading; and
  compact imaging lens means for focusing the light from the indicia along an optical path onto the sensors, including a pair of end focusing lenses of substantially a same size and spaced apart along the optical path, an intermediate lens between the end lenses, and an aperture stop between the end lenses, the end lenses having optical powers of a same sum and of about a same magnitude.

10. A method of electro-optically reading indicia, comprising the steps of:
  capturing light through a presentation area of a reader from the indicia over a field of view during reading by an array of image sensors of a solid-state imager; and
  focusing the light from the indicia along an optical path onto the sensors, including spacing apart along the optical path a pair of end focusing lenses of substantially a same size, positioning an intermediate lens between the end lenses, positioning an aperture stop between the end lenses, and configuring the end lenses with optical powers of a same sign and of about a same magnitude.

11. The method of claim 10, and positioning the intermediate lens within an aperture of the aperture stop, and configuring the intermediate lens with an optical power of opposite sign to that of the end lenses.

12. The method of claim 10, and positioning the intermediate lens midway between the end lenses.

13. The method of claim 10, and configuring the intermediate lens with a magnitude that compensates for the magnitudes of the end lenses.

14. The method of claim 10, and illuminating the indicia during reading with illumination light directed from an illuminating light source through the presentation area, and wherein the focusing step is performed by focusing the illumination light captured from the indicia onto the sensors.

15. The method of claim 14, and forming the illuminating light source as a plurality of light emitting diodes (LEDs).

16. The method of claim 10, and the step of holding the reader by a handle for handheld operation.

17. The method of claim 10, and the step of supporting the reader on a support surface for workstation operation.

18. The method of claim 10, and forming the presentation area with a light-transmissive window.

* * * * *

UNITED STATES PATENT AND TRADEMARK OFFICE
CERTIFICATE OF CORRECTION

PATENT NO. : 7,500,612 B2 Page 1 of 1
APPLICATION NO. : 11/496286
DATED : March 10, 2009
INVENTOR(S) : Shi et al.

It is certified that error appears in the above-identified patent and that said Letters Patent is hereby corrected as shown below:

1. In Column 4, Line 18, delete "includesa" and insert -- includes a --, therefor.

2. In Column 6, Line 4, in Claim 9, delete "sum" and insert -- sign --, therefor.

Signed and Sealed this

First Day of June, 2010

David J. Kappos
*Director of the United States Patent and Trademark Office*